United States Patent
Galeazzi

(10) Patent No.: US 9,546,580 B2
(45) Date of Patent: Jan. 17, 2017

(54) INTERNAL COMBUSTION ENGINE WITH A DOUBLE-STAGE SEPARATION BLOW-BY GAS RECIRCULATION SYSTEM

(71) Applicant: Fiat Group Automobiles S.p.A., Turin (IT)

(72) Inventor: Giampaolo Galeazzi, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 36 days.

(21) Appl. No.: 14/800,068

(22) Filed: Jul. 15, 2015

(65) Prior Publication Data
US 2016/0024984 A1 Jan. 28, 2016

(30) Foreign Application Priority Data

Jul. 24, 2014 (IT) .............................. TO2014A0590

(51) Int. Cl.
*F01M 13/04* (2006.01)
*F02M 25/06* (2016.01)
(Continued)

(52) U.S. Cl.
CPC .......... *F01M 13/04* (2013.01); *B01D 19/0052* (2013.01); *F02B 75/20* (2013.01);
(Continued)

(58) Field of Classification Search
CPC ........... F01M 13/04; F01M 2013/0422; B01D 19/0052; B01D 45/14; F02M 25/06; F02B 75/20; F02F 7/0068; F02F 7/0043
(Continued)

(56) References Cited

U.S. PATENT DOCUMENTS 5,261,380 A * 11/1993 Romano ................ F01M 13/04
123/573
5,564,380 A 10/1996 Kobayashi
(Continued)

FOREIGN PATENT DOCUMENTS

DE 102004045630 4/2006
DE 102008037350 2/2009
(Continued)

OTHER PUBLICATIONS

Search Report for Italian Application No. TO2014 A 000590 mailed Mar. 24, 2015, 2 pages.

*Primary Examiner* — Marguerite McMahon
(74) *Attorney, Agent, or Firm* — Remarck Law Group PLC

(57) ABSTRACT

An engine includes a crankcase; an oil sump; at least one balancing shaft mounted in a balancing tunnel of the crankcase, which includes first and second end portions and a central portion extending between the end portions; and a blow-by gas recirculation system having an inlet channel communicating with the oil sump, an outlet channel communicating with an intake manifold, a centrifugal separator arranged between said inlet and outlet channels, and a drainage channel opening into the oil sump for discharging separated liquid. The inlet channel communicates with said first end portion, and said centrifugal separator is housed in said second end portion and is driven in rotation by said balancing shaft. The outlet channel communicates with a gas outlet of said centrifugal separator, whereby, during operation, blow-by gas flows successively through the central portion and the centrifugal separator in a path from the inlet to the outlet channel.

6 Claims, 4 Drawing Sheets

(51) Int. Cl.
*F02B 75/20* (2006.01)
*F02F 7/00* (2006.01)
*B01D 19/00* (2006.01)
*B01D 45/14* (2006.01)

(52) U.S. Cl.
CPC .......... *F02F 7/0043* (2013.01); *F02F 7/0068* (2013.01); *F02M 25/06* (2013.01); *B01D 45/14* (2013.01); *F01M 2013/0422* (2013.01)

(58) Field of Classification Search
USPC .................................................. 123/572–574
See application file for complete search history.

(56) References Cited

U.S. PATENT DOCUMENTS

| | | | | |
|---|---|---|---|---|
| 7,309,308 B2* | 12/2007 | Berger | .................... | F01M 13/04 |
| | | | | 123/572 |
| 2002/0026928 A1* | 3/2002 | Korenjak | ............... | F01M 11/02 |
| | | | | 123/572 |
| 2009/0044791 A1* | 2/2009 | Rice | ....................... | F01M 13/04 |
| | | | | 123/574 |

FOREIGN PATENT DOCUMENTS

| JP | S5529077 | 3/1980 |
|---|---|---|
| JP | S57193708 | 11/1982 |
| JP | 2009222044 | 10/2009 |
| JP | 2013007275 | 1/2013 |

\* cited by examiner

INTERNAL COMBUSTION ENGINE WITH A DOUBLE-STAGE SEPARATION BLOW-BY GAS RECIRCULATION SYSTEM

CROSS REFERENCE TO RELATED APPLICATIONS

This application claims priority to Italian Patent Application No. TO 2014 A 000590 filed on Jul. 24, 2014, the entire disclosure of which is incorporated herein by reference.

FIELD OF THE INVENTION

The present invention relates to an internal combustion engine equipped with a blow-by gas recirculation system including a centrifugal separator.

PRIOR ART

The blow-by gas in an internal combustion engine is generated by the dispersions of gas that pass from the combustion chambers within the oil sump. The blow-by gas holds oil particles in suspension that derive from the splashing of oil due to the moving parts within the oil sump. The latest engines are equipped with a recirculation system of the blow-by gas, which picks up the blow-by gas from the oil sump of the engine and sends it to the intake manifold of the engine after separating the oil in suspension.

In order to carry out the filtration of the blow-by gases, in the prior art various types of oil separators have been provided, for example, labyrinth separators, centrifugal separators, etc.

The document DE 102004045630 describes a centrifugal separator for separating oil from a ventilation gas coming from the oil sump of an internal combustion engine. The centrifugal separator described in this document comprises a hollow shaft for the outlet of the purified air and a rotating chamber driven in rotation from the shaft and in which the centrifugal separation of the oil is carried out. The centrifugal separator comprises a labyrinth pre-separator that rotates together with the separation chamber.

OBJECT AND SUMMARY OF THE INVENTION

The present invention aims to maximize the separation of the oil contained in the blow-by gas of an internal combustion engine.

According to the present invention, this object is achieved by an internal combustion engine having the characteristics forming the subject of claim 1.

The present invention envisages the mounting of a centrifugal separator on the balancing shaft of an engine which rotates in a balancing tunnel of the crankcase, and passing the blow-by gas through the balancing tunnel. The high speed of rotation and the eccentric shape of the balancing shaft impart a whirling motion to the blow-by gas that crosses the balancing tunnel, which carries out a secondary separation of the oil on the walls of the balancing tunnel upstream of the centrifugal separator in which the primary separation is carried out. The oil suspended in the blow-by gas that passes through the balancing tunnel has the advantageous effect of lubricating the bearings of the balancing shaft.

The claims form an integral part of the disclosure provided in relation to the invention.

BRIEF DESCRIPTION OF THE DRAWINGS

The present invention will now be described in detail with reference to the attached drawings, given purely by way of non-limiting example, wherein.

DETAILED DESCRIPTION

Figure 1:
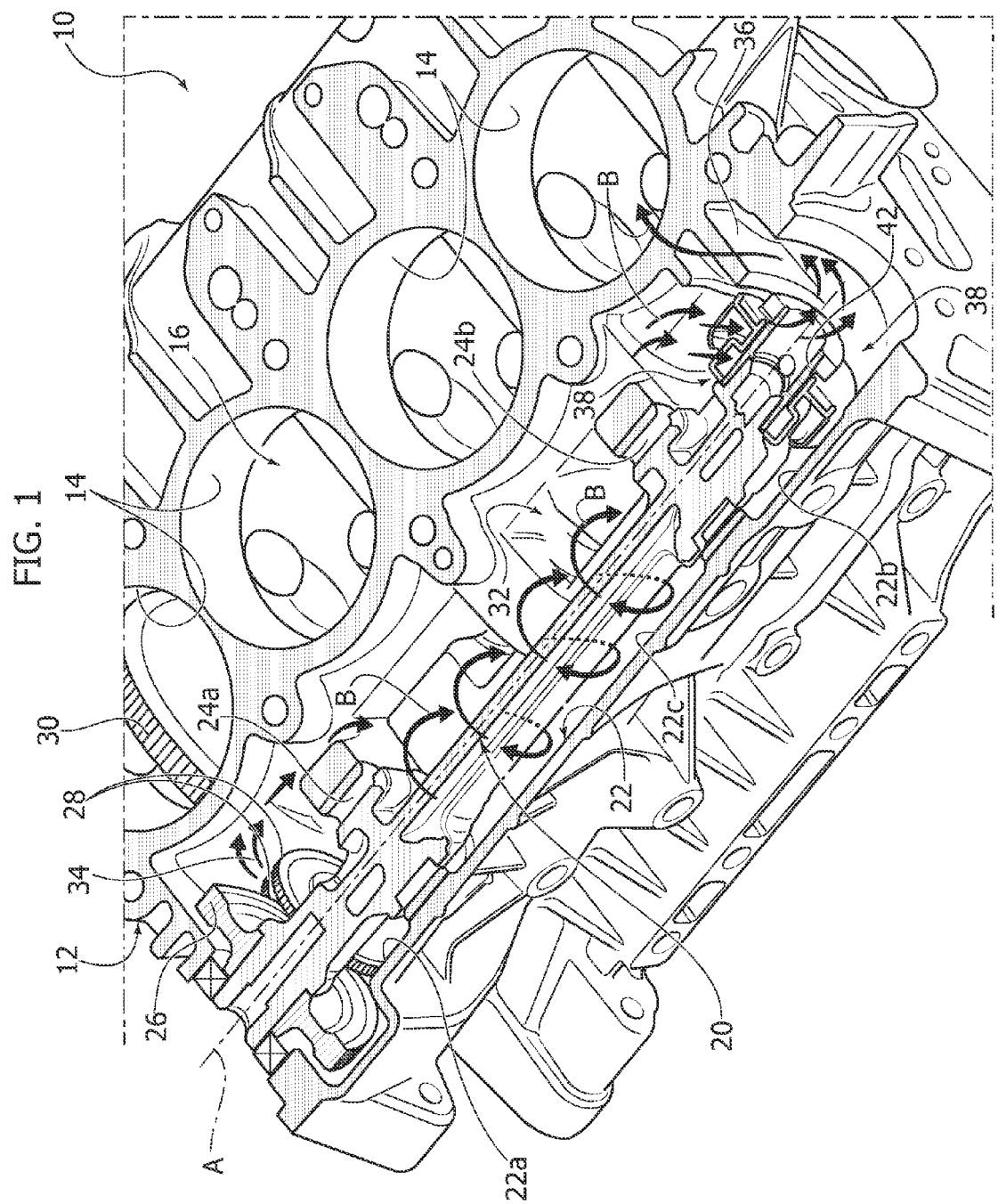
FIG. 1 is a perspective cross-sectional view illustrating an internal combustion engine according to the present invention.
Figure 2:
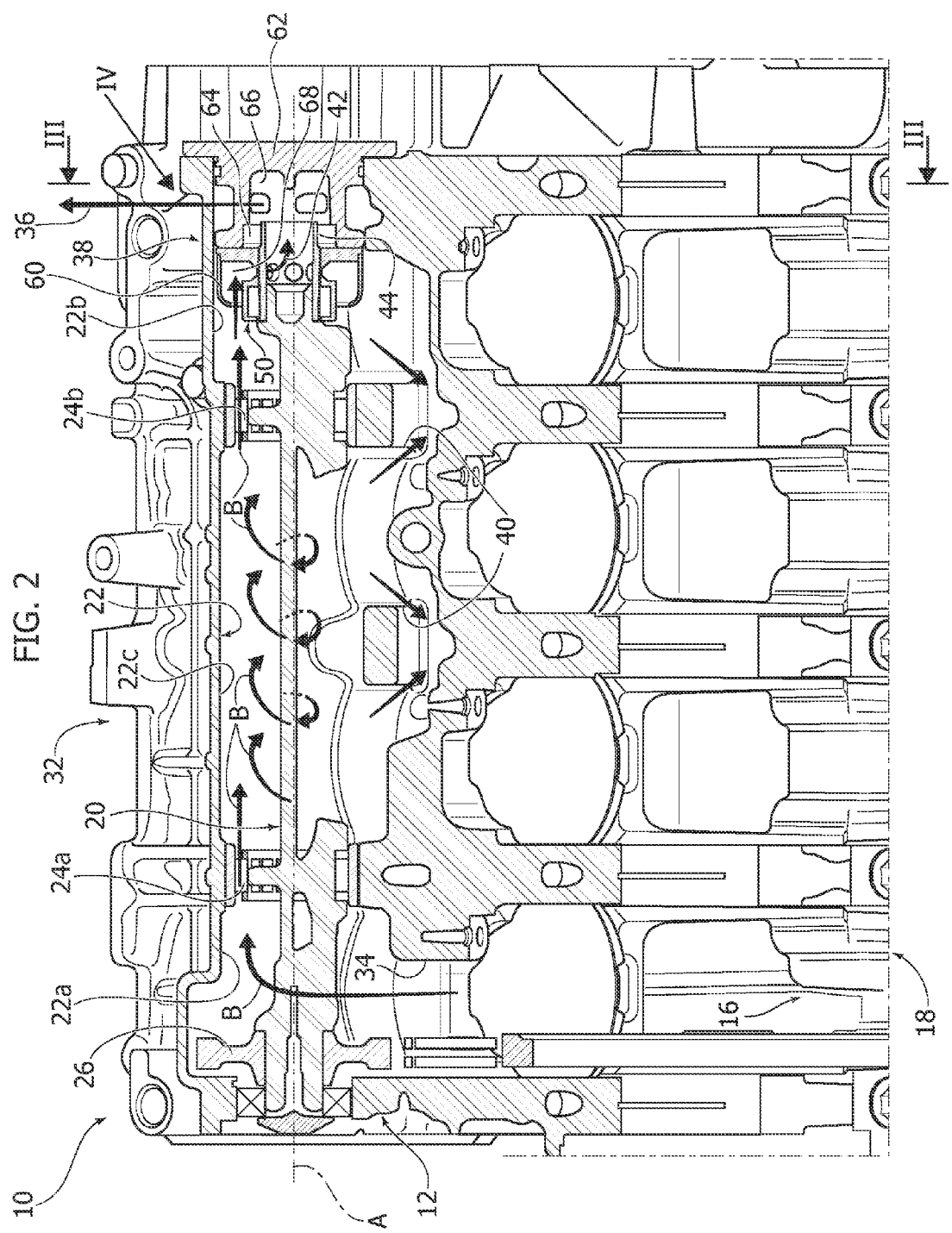
FIG. 2 is a schematic cross-sectional view of the engine of FIG. 1.
Figure 3:
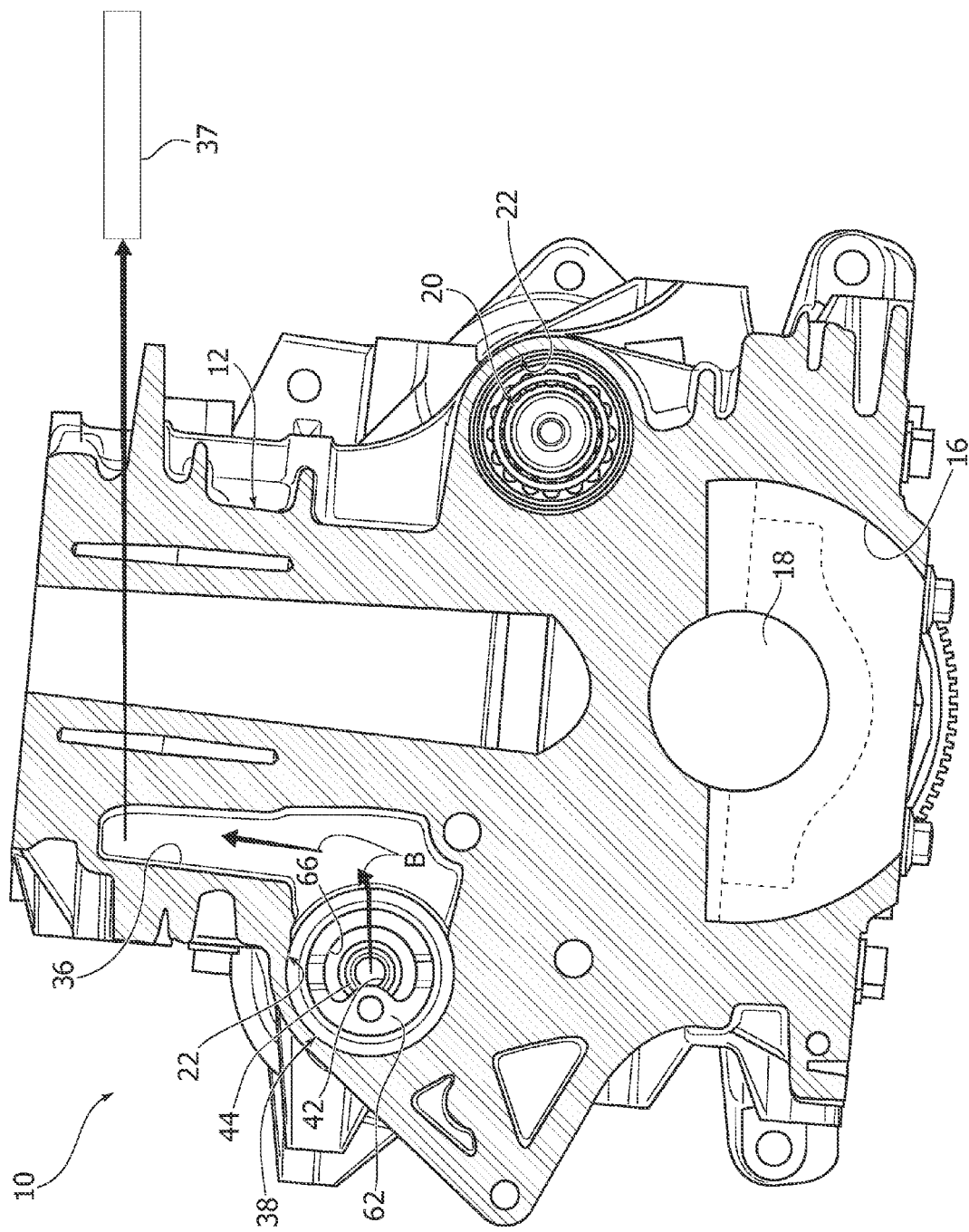
FIG. 3 is a cross-section according to the line III-III of FIG. 2.

With reference to FIGS. 1 to 3, numeral 10 indicates an internal combustion engine according to the present invention. The engine 10 comprises a crankcase 12 in which a plurality of cylinders 14 are formed. The engine 10 has an oil sump 16 in which an engine shaft 18 is housed.

The engine 10 comprises at least one balancing shaft 20 which is rotatably mounted about a longitudinal axis A within a balancing tunnel 20 formed within the crankcase 12. As shown in FIG. 3, the engine 10 could be provided with two balancing shafts 20 mounted within respective balancing tunnels 22. In the following description, reference will be made to a single balancing shaft 20 and it is understood that what is described with reference to one balancing shaft can also be applied to the other balancing shaft.

The balancing tunnel 22 has a first end portion 22a, a second end portion 22b and a central portion 22c extending between the first and second end portions 22a, 22b. The first and second end portions 22a, 22b of the balancing tunnel 22 carry respective bearings 24a, 24b which support the balancing shaft 20 in a rotatable manner about the axis A. In the first end portion 22a of the balancing tunnel 22, a gear wheel 26 is housed, fixed to the balancing shaft 20 and connected to the engine shaft 18 by means of one or more transmission gear wheels 28, 30 (FIG. 1). The balancing shaft 20 could be driven in rotation with a different type of transmission from the gear wheel transmission illustrated in the figures, for example, by means of a chain transmission or a toothed belt transmission. The balancing shaft 20 has an eccentric section at least at the central portion 22c of the balancing tunnel 22.

The engine 10 comprises a recirculation system of the blow-by gases 32. The recirculation system of the blow-by gas 32 picks up the blow-by gas from the oil sump 16, carries out the removal of the oil particles and sends the flow of gas purified from the oil to the air manifold of the engine, schematically indicated by 37 in FIG. 3.

The recirculation system of the blow-by gas 32 comprises an inlet channel 34 in communication with the inside of the oil sump 16, an outlet channel 36 in communication with the intake manifold 37, and a centrifugal separator 38 arranged between the inlet channel 34 and the outlet channel 36. The recirculation system of the blow-by gas 32 comprises at least one drainage channel 40 which opens into the oil sump 16, to guide the liquid separated from the blow-by gas into the oil sump 16, below the oil level. In the example illustrated in FIG. 2, two drainage channels 40 are provided. The inlet, outlet and drainage channels 34, 36, 40 are formed inside the crankcase 12.

The inlet channel 34 of the recirculation system of the blow-by gas 32 communicates with the first end portion 22a of the balancing tunnel 22. The centrifugal separator 38 is housed in the second end portion 22b of the balancing tunnel 22. The centrifugal separator 38 has a gas outlet 42 in communication with the outlet channel 36 of the recirculation system of the blow-by gas 32. In this way, as is shown in FIGS. 1 and 2, the blow-by gas passes through the central portion 22c of the balancing tunnel 22 and through the bearings 24a, 24b in the path from the inlet channel 34 to the outlet channel 36.

During operation, the balancing shaft 20 rotates around the axis A at a high speed (up to 10,000 RPM). The high speed of rotation of the balancing shaft 20 and the eccentric section of the balancing shaft 20 at the central portion 22c of the balancing tunnel 22 impart a whirling path to the flow of blow-by gas in the central portion 22c of the balancing tunnel 22. In FIGS. 1 and 2, the arrows B indicate the path of the blow-by gas through the recirculation system 32 from the inlet channel 34 to the outlet channel 36. The vortex of the blow-by gas within the central portion 22c of the balancing tunnel 22 projects the drops of oil suspended in the gas in a radial direction outwards and carries out a secondary centrifugal separation of the oil from the gas. The oil that is deposited on the inner walls of the balancing tunnel 22 returns to the oil sump 16 via the drainage channels 40. The oil suspended in the flow of blow-by gas that passes through the balancing tunnel 20 lubricates the bearings 24a, 24b of the balancing shaft 20.

Figure 4:
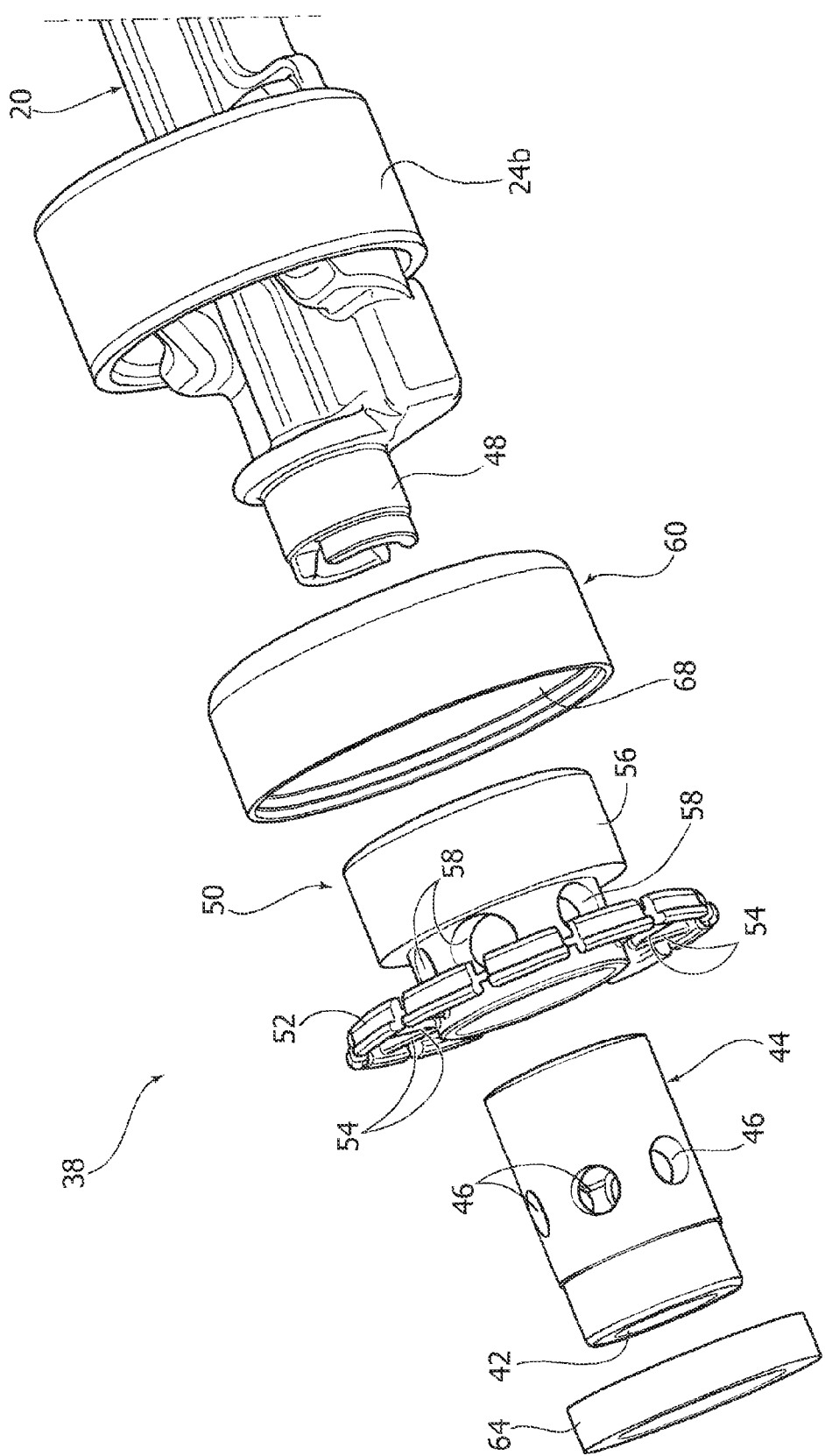
FIG. 4 is an exploded perspective view of the centrifugal separator indicated by the arrow IV in FIG. 2.

The secondary separation which occurs in the balancing tunnel 22 is a preliminary separation upstream of the main centrifugal separation performed by the centrifugal separator 38. The centrifugal separator 38 can be formed of any known separating device. In FIG. 4, a preferred embodiment of a centrifugal separator 38 is illustrated. The centrifugal separator 38 shown in FIG. 4 comprises a hollow bushing 44 equipped on its lateral wall with through-holes 46. One end of the bushing 44 forms the gas outlet 42 of the centrifugal separator 38. The opposite end of the bushing 44 is fixed on one end 48 of the balancing shaft 20. The centrifugal separator 38 comprises an impeller 50 having a radial wall 52 provided with radial channels 54. The impeller 50 has a hub 56 equipped with holes 58 aligned with the holes 46 of the bushing 44. The hub 56 of the impeller 50 is fixed on the bushing 44. The centrifugal separator 38 also comprises a cup-shaped element 60 with an open edge fixed to the outer edge of the radial wall 52 of the impeller 50. The cup-shaped element 60 has a gas inlet opening that surrounds the hub 56 of the impeller 50. The cup-shaped element 60 defines a separation chamber 68 in which the centrifugal separation of the oil suspended in the flow of blow-by gas takes place.

With reference to FIGS. 2 and 4, a cover 62 is fixed to the crankcase 12 to close an open end of the balancing tunnel 22. The cover 62 outwardly seals the second end portion 22b of the balancing tunnel 22. The cover 62 carries a sealing ring 64, which acts on one end of the bushing 44. The cover 62 has a chamber 66, which communicates with the outlet 42 of the centrifugal separator 38 and with the outlet channel 36 (FIG. 3) of the recirculation system of the blow-by gas 32.

With reference to FIG. 2, the chamber 66 of the cover 62 and the outlet 42 of the centrifugal separator 38 are in communication with the outlet channel 36 which, in turn, is connected to the intake manifold 37 (FIG. 3) of the engine 10.

During operation, the flow of blow-by gas enters the separation chamber 68 defined within the cup-shaped element 60. The drops of oil suspended in the flow of blow-by gas are projected in a radial direction outwardly through the radial channels 54 of the impeller 50. The flow of air purified from the oil in suspension passes within the holes 58, 46 of the impeller 50 and the bushing 44, and is sent to the intake manifold 37 of the engine through the chamber 66 of the cover 62 and the outlet channel 36.

Of course, without prejudice to the principle of the invention, the details of construction and the embodiments may be widely varied with respect to what is described and illustrated without departing from the scope of the invention as defined by the following claims.

What is claimed is:

1. An internal combustion engine comprising:
   a crankcase,
   an oil sump,
   at least one balancing shaft rotatably mounted in a balancing tunnel formed in the crankcase, wherein the balancing tunnel has a first end portion, a second end portion and a central portion extending between said first and second end portions, and
   a blow-by gas recirculation system having an inlet channel in communication with the oil sump, an outlet channel in communication with an intake manifold, a centrifugal separator arranged between said inlet channel and said outlet channel, and at least one drainage channel which opens into the oil sump for discharging separated liquid;
   wherein:
   said inlet channel of the blow-by gas recirculation system communicates with said first end portion of the balancing tunnel,
   said centrifugal separator is housed in said second end portion of the balancing tunnel and is driven in rotation by said balancing shaft,
   said outlet channel of the blow-by gas recirculation system communicates with a gas outlet of said centrifugal separator, whereby, during operation, flow of blow-by gas flows successively through the central portion of the balancing tunnel and the centrifugal separator in a path from the inlet channel to the outlet channel, and
   said balancing shaft has an eccentric cross section at least at said central portion of the balancing tunnel.

2. The engine according to claim 1, wherein, during operation, said flow of blow-by gas passes through bearings of the balancing shaft in the path from the inlet channel to the outlet channel.

3. The engine according to claim 1, wherein said centrifugal separator comprises a hollow bushing fixed at one end of the balancing shaft, an impeller fixed on said bushing and a cup-shaped element fixed to said impeller and defining a rotating separation chamber.

4. The engine according to claim 3, wherein said bushing has an open end defining said gas outlet.

5. The engine according to claim 3, further comprising a cover fixed to the crankcase and which seals an open end of said second end portion of the balancing tunnel, said cover having a chamber in communication with said gas outlet and with said outlet channel.

6. The engine according to claim 5, wherein said cover carries a sealing ring which acts on an outer surface of said bushing.

* * * * *